(12) United States Patent
Roth et al.

(10) Patent No.: US 11,959,179 B2
(45) Date of Patent: Apr. 16, 2024

(54) CORROSION CONTROL COATING

(71) Applicant: Ewald Dörken AG, Herdecke (DE)

(72) Inventors: Marcel Roth, Düsseldorf (DE);
Gerhard Reusmann, Essen (DE);
Sandra Böhm, Ennepetal (DE)

(73) Assignee: EWALD DÖRKEN AG (DE)

( * ) Notice: Subject to any disclaimer, the term of this patent is extended or adjusted under 35 U.S.C. 154(b) by 251 days.

(21) Appl. No.: 16/190,230

(22) Filed: Nov. 14, 2018

(65) Prior Publication Data
US 2019/0352783 A1    Nov. 21, 2019

(30) Foreign Application Priority Data
Nov. 14, 2017  (EP) .................................. 17201687

(51) Int. Cl.
| | |
|---|---|
| *A61K 6/84* | (2020.01) |
| *A61F 2/28* | (2006.01) |
| *A61L 27/32* | (2006.01) |
| *A61L 27/34* | (2006.01) |
| *B05D 1/06* | (2006.01) |
| *C09D 5/10* | (2006.01) |
| *C09D 7/43* | (2018.01) |
| *C09D 183/04* | (2006.01) |
| *C23F 13/02* | (2006.01) |

(52) U.S. Cl.
CPC .............. *C23F 13/02* (2013.01); *C09D 5/103* (2013.01); *C09D 5/106* (2013.01); *C09D 7/43* (2018.01); *C09D 183/04* (2013.01); *C23F 2201/00* (2013.01)

(58) Field of Classification Search
None
See application file for complete search history.

(56) References Cited

U.S. PATENT DOCUMENTS

2013/0143032 A1* 6/2013 Iijima .................... C09D 5/106
                                                                428/323
2017/0101541 A1    4/2017 Roth et al.
2017/0101716 A1    4/2017 Roth et al.

FOREIGN PATENT DOCUMENTS

| EP | 2933355 A1 | 10/2015 |
|---|---|---|
| EP | 3153552 A1 | 4/2017 |
| EP | 3153557 A1 | 4/2017 |

* cited by examiner

*Primary Examiner* — Sheeba Ahmed
(74) *Attorney, Agent, or Firm* — Edward E. Sowers; Brannon Sowers & Cracraft PC

(57) ABSTRACT

The invention relates to a coating system, more particularly a corrosion control coating system, for generating cathodic corrosion protection on a metallic substrate, comprising at least two layers, and also to a method for producing it and to a substrate coated with the coating system.

16 Claims, 1 Drawing Sheet

CORROSION CONTROL COATING

CROSS-REFERENCE TO RELATED APPLICATION

This application claims the benefit of European Application No. EP 17 201 687.5 filed on Nov. 14, 2017, and incorporates all by reference herein, in its entirety.

BACKGROUND

The present invention relates to the technical field of corrosion control, more particularly of cathodic corrosion control.

The present invention relates more particularly to a coating system, especially a corrosion control coating system, for generating cathodic corrosion protection on a metallic substrate.

The present invention further relates to a method for producing the coating system and also to a metallic substrate coated with the coating system.

The present invention relates lastly to a kit for producing the coating system.

Signs of corrosion on metals are observed across all fields of industry, and are of great significance, since the durability or service life of machinery, vehicles, industrial plants or even buildings is dependent, often decisively so, on the corrosion properties of the metals used. Corrosion means that metal parts must be replaced or renovated, operations which always involve time, materials and costs.

According to DIN ISO 8044, corrosion is the physicochemical interaction between a metal and its environment that leads to a change in the properties of the metal and that can lead to considerable adverse effects on the functions of the metal, its surroundings, or the technical system in which the metal is used. Metal corrosion generally comprises electrochemical processes, specifically the oxidation of metals by atmospheric oxygen, possibly in the presence of electrolyte solutions, with formation of metal oxide layers.

Since corrosion processes often determine the durability or service life of metals or metal components, it is necessary to reduce the corrosion susceptibility and corrosion rate of metals. One way of protecting metals from corrosion is to use passive systems—coatings, for example, such as protective coatings—which is intended to protect the metal from environmental effects and hence from corrosion. Another way is to use active systems, where the metal for protection is employed as a cathode, with exploitation of electrochemical processes, and hence oxidation of the metal is prevented and/or metal ions that are formed are immediately reduced. The cathodic corrosion control may be obtained on the one hand by application of an external electrical voltage; on the other hand, however, it is also possible for the metal for protection to be brought into contact electrically with a baser metal, i.e. a metal having a lower electrochemical standard potential. The two metals then form an electrochemical system, in which the baser metal represents the anode, referred to as the sacrificial anode, and is oxidized, while the nobler metal is the cathode, at which reduction takes place.

One common form of cathodic corrosion control is the coating of metals or metal components with a baser metal. Especially in connection with the corrosion control of steel, a measure frequently adopted here is that of galvanization, in other words of a coating based on zinc or zinc alloys.

With galvanizing, steel customarily, especially steel sheet, is coated with elemental zinc by immersion into baths of molten zinc, in the process of hot dip galvanizing.

A further possibility is to obtain steel sheets or steel components electrolytically or electrochemically, by applying an external voltage to electrolyte baths containing zinc ions.

One special case of galvanizing is the use of zinc flake coatings, also called zinc flake primers. Zinc flake coatings and zinc flake primers comprise zinc lamellae, i.e. plateletshaped zinc pigments, in a predominantly inorganic binder. The mixture of binder and zinc lamellae is applied in the form of a dispersion to the metal part for protection, and the binder is subsequently crosslinked, thus producing a closed, homogeneous layer having a thickness of 5 to 15 µm. Despite the embedding of the zinc particles into a binder matrix, zinc flake coatings exhibit electrical conductivity and thus ensure a high level of protection; in particular, in the salt spray test at the scribe mark in accordance with DIN ISO 9227, at comparable film thickness, zinc flake coatings exhibit significantly improved corrosion resistance relative both to hot dip galvanized and to galvanized or electrogalvanized metal parts.

The predominantly inorganic matrix in which the zinc lamellae of zinc flake coatings or primers are embedded typically consists primarily of silicon dioxide or titanium dioxide. Typical zinc flake coatings, which are applied in the form of the corresponding coating composition to a substrate, are described in WO 2007/130838 A2, for example.

In contrast to hot dip galvanizing or to electrogalvanizing, zinc flake coatings and zinc flake primers offer the possibility in principle of applying the cathodic corrosion protection to a metal part or component only in a locally limited way and retrospectively, in other words after installation or assembly. Zinc flake primers therefore, at least in principle, permit the partial and/or retrospective coating of articles made from composite materials or of components that are sensitive to heat and/or moisture. For repair purposes as well, as for example if parts have to be renewed on relatively large steel constructions, it is appropriate for the repair facility to be equipped in situ with corrosion control systems based on zinc flake primers.

The actual use of zinc flake primers for such locally limited or mobile applications, however, is greatly restricted, since common zinc flake primer systems are cured or crosslinked at temperatures between 200 and 300° C. Particularly in the case of composite components which include plastics or wood, these temperatures cannot be employed. For mobile applications as well, temperature treatments of this kind are a disadvantage, since, while the necessary temperatures can be generated by means of infrared emitters and radiant heaters, the procedure is nevertheless complicated and therefore costly.

A further factor is that a large number of steel components which cannot or are not to be coated entirely with a corrosion control coating are equipped during the production operation itself with electronic components or with connections for electronic components, or else with ball bearings or lubricants, with the consequence that these components cannot be subjected subsequently to any further treatment involving temperatures of more than 100° C.

It is indeed possible in principle to employ specific solvent-free and water-free zinc flake primers with a solid fraction of 100 wt %—known as 100% systems or all-solids systems—which crosslink at room temperature or only slightly elevated temperature. With such systems it is often possible to ensure sufficient corrosion control, though this control is significantly lowered in relation to that provided by systems crosslinked at 200 to 300° C. Furthermore, the mechanical robustness of zinc flake primers of this kind, curing at room temperature, is also significantly lowered, and this is manifested, for example, in an increased abrasion: for instance, zinc flake primers cured at room temperature or only slightly elevated temperature leave metallically lustrous residues on the hands or on a cloth, when in contact. In the case of components which are contacted more frequently, this is unacceptable and is also, furthermore, a disadvantage, since the impression conveyed to the customer is of only a low value. Furthermore, zinc flake primers cured at room temperature often have not only inadequate cohesion but also deficient adhesion on the substrate: the coating is easy to remove again from a metallic substrate, as manifested in inadequate results in the adhesive tape removal test. For applications which require good adhesion of the zinc flake primer, for example for mechanical loadable components or else for components which are to be subsequently provided with further coatings, this low mechanical robustness is not acceptable.

Furthermore, zinc flake primers which cure at room temperature have a cure time of several days, this being associated with a marked deceleration in processing and with the provision of considerable storage capacities.

In the prior art, therefore, there continues to be a lack of a cathodic corrosion control system, more particularly of a zinc flake primer, which can be applied in a locally limited way and can be cured and crosslinked at room temperature or slightly elevated temperature, while exhibiting improved corrosion control and a greater mechanical robustness, more particularly abrasion resistance, by comparison with common systems. At the present time there are also no known cathodic corrosion control systems which cure rapidly at room temperature in such a way as to allow coated substrates to be installed or used a short time after coating.

SUMMARY

One object of the present invention is therefore considered that of avoiding, or at least attenuating, the aforesaid disadvantages and problems associated with the prior art.

A further object of the present invention is considered that of providing a system which ensures cathodic corrosion protection and can be applied with local limitation, including in particular in mobile systems.

Furthermore, a further object of the present invention is considered that of providing a corrosion control system which in relation to common systems exhibits improved corrosion resistance and also improved mechanical robustness, more particularly an improved abrasion resistance.

Furthermore, a further object of the present invention is considered that of providing a coating system which can be employed and applied simply and easily under a multitude of conditions.

A subject of the present invention, according to a first aspect of the present invention, is a coating system, more particularly a corrosion control coating system, for generating cathodic corrosion protection according to claim 1; further advantageous embodiments of this aspect of the invention are subjects of the relevant dependent claims.

A further subject of the present invention, according to a second aspect of the present invention, is a method for producing a coating system, more particularly a corrosion control coating system for generating cathodic corrosion protection on a metallic substrate, according to claim 14; further advantageous embodiments of this aspect of the invention are subjects of the relevant dependent claim.

Yet another subject of the present invention, according to a third aspect of the present invention, is a metallic substrate comprising a coating system according to claim 16.

Yet another subject of the present invention, lastly, according to a fourth aspect of the present invention, is a kit for producing a coating system, more particularly a corrosion control coating system, according to claim 17.

It will be readily understood that characteristics, features, versions and embodiments, and also advantages or the like, which are recited hereinbelow in respect of one aspect of the invention only, for the avoidance of unnecessary repetition, self-evidently also apply mutatis mutandis in respect of the other aspects of the invention, without the need for any express mention.

In addition, any value or parameter particulars or the like recited hereinbelow can in principle be determined or ascertained using standardized or explicitly recited methods of determination or else using methods of determination that are familiar per se to the skilled person in this field.

Furthermore, it is self-evident that all weight-based or quantity-based percentages will be selected by the skilled person in such a way as to result in a total of 100% or 100 wt %; this, however, is self-evident.

Subject to the above, the present invention is described in more detail below.

Figure 1:
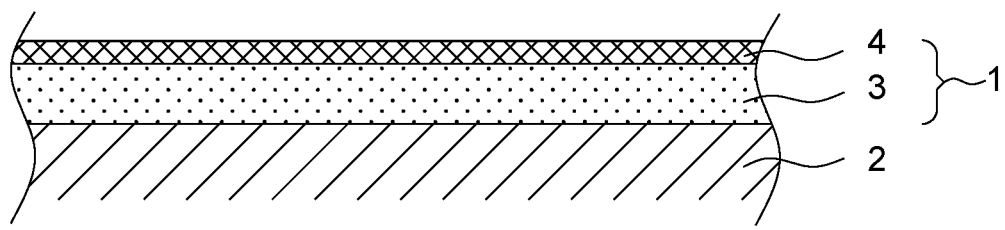
FIG. 1: provides a coating system according to the novel technology disclosed providing a substrate having first and second layers, wherein the second layer fully overlaps the first layer.

A subject of the present invention—according to a first aspect of the present invention—is therefore a coating system, more particularly a corrosion control coating system, for generating cathodic corrosion protection on a metallic substrate, comprising at least two layers, where the coating system comprises (a) a first layer in the form of a cathodic corrosion control coating which crosslinks on exposure to water, and
(b) a second layer in the form of a coating which is obtained by an aqueously based coating composition.

Indeed, as the applicant has surprisingly discovered, the corrosion resistance and more particularly the mechanical resistance, especially the abrasion resistance, of cathodic corrosion control coatings which crosslink by means of water, more particularly moisture, can be significantly improved if a further coating based on a water-containing binder is applied to the cathodic corrosion control coating.

In this way, the binder of the cathodic corrosion control coating cures rapidly and completely, and the adhesion of the cathodic corrosion control coating to the metallic substrate is significantly improved. It has also emerged, furthermore, that not only is there significant improvement in the adhesion of the cathodic corrosion control coating, such as of a zinc flake primer, for example, but also in the cohesion of the cathodic corrosion control coating, i.e. the first layer in the coating system of the invention. In particular, no abrasion, of zinc flakes, for example, on mere contact is observed any longer. The first layer, particularly the cathodic corrosion coating, is also referred to hereinafter as the basecoat.

Through the controlled curing of a cathodic corrosion control coating which crosslinks by means of water, more particularly of moisture, through a water-based topcoat applied thereto, it is possible to crosslink the cathodic corrosion control coating at low temperatures, more particularly at room temperature or at least at temperatures below 100° C.

In this way, the coating system of the invention, more particularly corrosion coating system, is outstandingly suitable, for example, for mobile applications.

Furthermore, the coating of metallic substrates with the corrosion control coating used in accordance with the invention need not take place in specific conditioned-atmosphere chambers at defined atmospheric humidity; instead, the moisture that is required for crosslinking is provided by the further coating, more particularly the second layer, referred to as the topcoat. The coating system of the invention therefore allows a simplification in terms of process engineering by comparison with existing systems, and opens up new application possibilities for moisture-crosslinking corrosion control coatings at low temperatures.

The mechanical robustness of the coating system of the invention is only slightly poorer than that of systems which are cured or crosslinked at 200 to 300° C.

Furthermore, the coating system of the invention allows commercially available zinc lamellae, which are normally treated with stearic acid, to be processed without further pretreatment in room-temperature-curing systems, since the cohesion of the coating system of the invention is sufficiently so high that only little or no abrasion is observed under normal circumstances.

Zinc flake primers based on siloxane and/or titanates, crosslinked at room temperature, typically display a microporous structure, entailing low adhesion and cohesion on the part of the coating; in the context of the present invention, however, this is avoided.

The coating system of the invention is outstandingly suitable especially for the partial coating of components, more particularly of components made from composite materials, or else for the coating of components which may not be heated to a temperature of 100° C. or more, such as brake discs, for example.

A substrate in the context of the present invention is any suitable three-dimensional object or any surface to which the coating system of the invention can be applied. Preferably, however, the substrate is an article, more particularly a component, to which the coating system is at least partially applied.

In the context of the present invention, particularly good results are obtained if the first layer comprises an inorganically based matrix. Particularly good results are obtained in this context if the matrix, more particularly the inorganically based matrix, is organically modified.

An inorganically based matrix in the context of the present invention is a binder system, more particularly a cured binder system, which more particularly is composed at least substantially of inorganic materials, such as silicon dioxide, titanium oxide or zirconium oxide, for example. Incorporated in this inorganically based matrix—especially when using zinc flake primers, for example—are often fillers or inorganic pigments, more particularly anti-corrosion pigments.

An organically modified inorganically based matrix, in the context of the present invention, means that the inorganically based matrix, more particularly the at least substantially inorganically based matrix, comprises organic functionalities, more particularly in the form of alkyl groups, such as methyl or ethyl, for example, vinyl groups or phenyl groups, which are bonded to metals or semi-metals in the matrix. By virtue of organic modification of the inorganically based matrix, the coating system overall is less brittle and more flexible and so is able to adapt, for example, more effectively to temperature-induced changes in length of the metallic substrate. Furthermore, as a result of a certain fraction of organic radicals, a greater compatibility with any applied organically based topcoat is also achieved. A particular effect of the organic modification, preferably in the form of organic radicals of silicon, titanium or zirconium, is to reduce the crosslinking density, leading to an increased flexibility of the coating and to a reduced contraction.

As far as the material of the inorganically based matrix is concerned, it has been found appropriate for the inorganically based matrix to comprise inorganic oxides, more particularly oxides of silicon, of titanium and/or of zirconium, or more particularly to consist at least substantially thereof. It is particularly preferred in this context if the inorganically based matrix comprises silicon dioxide and/or titanium dioxide, preferably titanium dioxide, or more particularly consists at least substantially thereof.

In the context of the present invention, the inorganically based matrix is typically obtained by condensation reactions of inorganic and/or organic groups and/or polymerization reactions of organic groups, preferably condensation reactions, from silanes, polysilanes, silane hydrolysates, polysiloxanes, siliconates, titanates, polytitanates and zirconates. In the context of the present invention it has been found particularly appropriate if the inorganically based matrix is obtainable by condensation reactions particularly of inorganic groups from silanes, silane hydrolysates, polysiloxanes, titanates and polytitanates and mixtures thereof. With the aforementioned inorganic or inorganically based compounds, in particular, it is possible to provide particularly resistant inorganic binder systems.

As already observed above, the first layer crosslinks on exposure to water. Generally speaking, provision is made in this context for the first layer to crosslink by exposure to moisture, more particularly by exposure to atmospheric moisture. Binder systems based on titanates, zirconates or else special siloxane-based systems, in particular, crosslink by polycondensation on exposure to moisture, more particularly atmospheric moisture. The first layer, or the binder system of the first layer, of the coating system of the invention need not be exposed to a sizeable amount of liquid water for a prolonged time; instead, it is sufficient for there to be adequate distribution of steam or small water droplets in the gas phase, i.e. in the surrounding atmosphere, or on the coating surface. For example, the coating composition for producing the second layer may be sprayed in fine distribution onto the first layer. The atomization of the aqueous binder composition of the second layer provides sufficient moisture for the crosslinking of the first layer in the coating system of the invention. It has emerged that a fine atomization of the aqueous binder composition of the second layers leads to particularly good results, more particularly to increased stability of the first layer. This is probably attributable to the fact that, as a result of the fine atomization, water molecules are able to diffuse more quickly into the first layer than in the case of larger water drops or even water films.

Furthermore, the use of aqueous binder compositions for the second layer has the advantage that when using silicon-, titanium- or zirconium-based binder systems of the first layer in combination with metal particles, such as zinc flake primers, for example, there are conversion products, $ZnSiO_4$ for example, formed in the first layer that close the pores in the first layer and in this way further increase the corrosion protection.

As observed above, in the context of the present invention, the first layer of the coating system of the invention is cured or crosslinked preferably at low temperatures.

In the context of the present invention it is preferred if the first layer crosslinks at temperatures of less than 100° C., more particularly less than 90° C., preferably less than 80° C.

In the context of the present invention it is preferred if the first layer crosslinks at temperatures of 5 to 100° C. Equally, very good results are obtained if the first layer crosslinks at room temperature, more particularly at temperatures in the range from 5 to 30° C., and/or if the first layer crosslinks at temperatures in the range from 20 to 100° C., more particularly 30 to 90° C., preferably 50 to 80° C. Crosslinking at higher temperatures here leads in particular to accelerated curing or crosslinking of the first layer, which is concluded within a few minutes if suitable binder systems are chosen. This is a distinct advantage over existing systems which cure at low temperatures, more particularly at room temperature, and which have to be stored in special conditioned-atmosphere chambers at defined atmospheric humidity for up to 7 days, in order for abrasion resistances to be obtained that are acceptable at least to some extent.

In the context of the present invention, it is typically the case that the first layer comprises metal particles. The cathodic corrosion protection is therefore provided preferably by the use of metal particles made of a metal which is baser by comparison with the metal substrate, i.e. of a metal which has a smaller standard potential than the metal for protection.

The first layer generally comprises at least 50 wt %, more particularly at least 60 wt %, preferably at least 70 wt % of metal particles, based on the first layer.

Equally, very good results are obtained if the first layer comprises a fraction of metal particles in the range from 50 to 95 wt %, more particularly 60 to 95 wt %, preferably 70 to 90 wt %, based on the first layer.

The first layer therefore preferably comprises a very high fraction of metal particles in order to ensure permanent cathodic corrosion protection.

As regards the nature of the particles, they may be selected from all suitable metal particles. It has been found appropriate, however, if the first layer comprises platelet-shaped and/or granular, more particularly spherical, metal particles.

According to a preferred embodiment, it is the case in this context that the first layer solely comprises granular, more particularly spherical, metal particles, more particularly in the form of anti-corrosion pigments.

According to a further preferred embodiment of the present invention, the first layer comprises platelet-shaped and granular, more particularly spherical, metal particles. Through the use of platelet-shaped and granular, more particularly spherical, metal particles, it is possible to achieve further significant improvement in the corrosion control effect of the cathodic corrosion control coatings, since platelet-shaped metal particles, the so-called lamellae, ensure significantly improved corrosion protection. However, as the fraction of platelet-shaped metal particles, i.e. lamellae, increases, there is a sharp increase in the viscosity of the coating composition from which the cathodic corrosion coating is obtained.

If the first layer comprises both platelet-shaped and granular, more particularly spherical, metal particles, then it has proven appropriate if the first layer comprises a weight-based ratio of platelet-shaped to granular metal particles in the range from 19:1 to 1:19, more particularly 10:1 to 1:15, preferably 1:1 to 1:12, more preferably 1:2 to 1:10, very preferably 1:3 to 1:9. The first layer therefore preferably comprises a high fraction of metal particles, more particularly granular, preferably spherical, metal particles. This relates in particular to solvent-free systems or to systems which contain less than 5 wt % of solvents, preferably less than 3 wt % of solvents, the weight percentage figures here being based on the particular coating compositions from which the coating is obtained.

According to an embodiment of the present invention that is preferred in turn, the first layer comprises platelet-shaped metal particles. More particularly, according to this embodiment of the present invention, the first layer preferably comprises solely platelet-shaped metal particles as anti-corrosion pigments. Since the use of platelet-shaped metal particles, or lamellae, is associated with a sharp increase in the viscosity of the coating composition, such coating compositions have a fraction of organic solvents of up to 20 wt %, in order to adjust the viscosity of the coating composition.

Platelet-shaped metal particles are also referred to in the general usage as flakes or lamellae. Platelet-shaped metal particles have a significantly lower extent in one spatial direction, this extent being referred to hereinafter as thickness; the extent in the two other spatial directions is referred to hereinafter as diameter. Platelet-shaped metal particles in particular have at least one principal direction of extent. Granular metal particles are irregularly shaped metal particles, whereas spherical metal particles possess approximately ball architecture. The use of spherical metal particles is typically preferred over the use of granular metal particles.

As far as the dimensioning of the metal particles is then concerned, it may vary within wide ranges.

Generally, it is the case that the platelet-shaped metal particles have a thickness of 50 to 1000 nm, more particularly 60 to 750 nm, preferably 80 to 600 nm, more preferably 100 to 500 nm.

Equally it may be the case that the platelet-shaped metal particles have a diameter, more particularly a length along their principal direction of extent, of 1 to 25 µm, more particularly 2 to 20 µm, preferably 5 to 18 µm, more preferably 5 to 15 µm.

If granular, more particularly spherical, metal particles are used in the context of the present invention, it has been found appropriate if the metal particles have diameters in the range from 500 nm to 20 µm, more particularly 500 nm to 10 µm, preferably 500 nm to 5 µm.

With regard, then, to the material of which the metal particles are formed, it has been found appropriate if the metal particles are formed on the basis of aluminium, zinc or alloys thereof. Particularly good results are obtained in this context if the metal particles are formed on the basis of pure zinc and/or of zinc alloys.

In this context, especially good results are obtained in particular when spherical or granular metal particles consist of pure zinc and platelet-shaped metal particles consist of zinc alloys.

If metal particles based on zinc alloys are used, the zinc alloys are typically selected from zinc-bismuth alloys, zinc-aluminium alloys and/or zin-caluminium-magnesium alloys. It is particularly preferred in this context if the zinc alloys are selected from zinc-aluminium alloys and/or zinc-aluminium-magnesium alloys. The best results are obtained if the zinc alloy is a zinc-aluminium-magnesium alloy.

Furthermore, provision may likewise be made for the first layer to comprise further fillers. If the first layer comprises at least one further filler, it has been found appropriate if the first layer comprises the filler in amounts of 0.5 to 10 wt %, more particularly 1 to 8 wt %, preferably 1 to 5 wt %, based on the first layer.

Fillers which can be used are virtually any particulate ingredients that are stable under usage conditions, more particularly inorganic minerals, glasses, ceramic substances, and metals. It has, however, emerged that particularly good results are obtained if the filler is selected from metals, more particularly from Mg, Sn, Ni, Mn, Bi, W or stainless steel, and also mixtures and alloys thereof.

Equally, particularly good results are obtained if the filler is selected from the group of boron nitride, tungsten carbide and glasses. The fillers may be used alternatively to or jointly with the metallic fillers.

As far, then, as the second layer of the coating system of the invention is concerned, the second layer is formed typically in the form of a transparent layer, more particularly a clearcoat. A transparent form of the second layer is not absolutely necessary, but in the context of the invention the second layer is typically used in the form of a clearcoat. There is normally no pigmentation of the second layer, since the second layer serves primarily for the curing and better adhesion of the first layer and is to be applied with an extremely low layer thickness.

In the context of the present invention, it is typically the case that the second layer comprises at least one hydrophilic, inorganic or organic, oligomeric or polymeric, preferably polymeric, compound or a hydrophobic organic compound, or more particularly consists at least substantially thereof. Particularly good results are obtained in this context if the second layer comprises at least one hydrophilic, inorganic or organic, polymeric compound or more particularly consists at least substantially thereof. With preference the second layer comprises at least one hydrophilic, inorganic, polymeric compound or at least one organic, oligomeric or polymeric compound, or more particularly consists at least substantially thereof.

An inorganic polymeric compound in the context of the present invention is a compound that forms a three-dimensional network, such as silicon dioxide, titanium dioxide or zirconium dioxide, for example. Particularly good results are obtained—as already mentioned above—if at least one hydrophilic, inorganic or organic, oligomeric or polymeric compound is used.

The hydrophilic, inorganic or organic, oligomeric or polymeric compound is polar and comprises preferably ionic fractions.

More particularly, it is especially preferred if the inorganic or organic, oligomeric or polymeric compound comprises ionic fractions and/or the hydrophilic, inorganic or organic, polymeric compounds have additionally been admixed with ionic compounds. It is particularly preferred in this context if the ionic compound forms a part of the binder and is present in immobilized form in the coating. In this way, activation, especially of zinc flake primers, is achieved, as observed further hereinafter.

If in the context of the present invention a hydrophobic, organic compound is used, it has been found appropriate if the hydrophobic, organic compound is formed of $C_{12}$ to $C_{25}$ carboxylic acids, waxes, PVDF and PTFE. It is preferred in this context if the hydrophobic, organic compound is selected from $C_{15}$ to $C_{20}$ carboxylic acids, waxes, PVDF and PTFE. The abbreviation PVDF refers to the thermoplastic polymer polyvinylidene fluoride, and PTFE stands for polytetrafluoroethylene.

If in the context of the present invention a hydrophilic, inorganic or organic, oligomeric or polymeric compound is used, it has been found appropriate if the inorganic and/or organic, oligomeric or polymeric compound is selected from the group of silicates, waterglasses, silane hydrolysates, silicon dioxide, silicones, waxes, organic polymers and mixtures thereof.

Particularly good results are obtained in this context if the hydrophilic, inorganic and/or organic, oligomeric or polymeric compound is selected from the group of silicates, silicon dioxide, more particularly silica sols, organic polymers and mixtures thereof.

As far as the organic polymers are concerned, they are typically selected from cationic organic polymers, anionic organic polymers and mixtures thereof.

An anionic organic polymer here is an organic polymer which contains deprotonatable acid functions, more particularly carboxylic, sulfonic, phosphonic or phosphoric acid groups, which are converted by neutralization with bases, preferably with amines or ammonia, into an anionic polymer. The anionic polymers are also referred to as cationically stabilized polymers, since the anionic polymer comprises cations as counter-ions, more particularly ammonium ions.

A cationic polymer in the context of the present invention is a polymer which comprises amine groups which can be protonated and converted into a cationic form by means of an acid, more particularly an organic acid, such as sulfonic or phosphonic acid compounds, for example, or a carboxylic acid. The deprotonated acid or deprotonated acid derivative functions here as a counterion. Cationic polymers are therefore also referred to as anionically stabilized polymers.

Polymers of this kind, especially cationically stabilized polymers, are formed more particularly on the basis of polyurethanes, styrene acrylates or polyacrylates. Particularly good results are obtained in this context if the cationically stabilized polymer is selected from aliphatic polycarbonate-polyurethanes and polyacrylates.

The organic polymers preferably have a weight-average molecular weight Mw of more than 1000 g/mol, preferably more than 2000 g/mol. It is particularly preferred if the organic polymers have a weight-average molecular weight Mw in the range from 1000 to 50 000 g/mol, more particularly 1500 to 20 000 g/mol, preferably 2000 to 10 000 g/mol.

According to one particularly preferred embodiment of the present invention, active constituents of conversion coatings are added to the coating composition in order to generate the second layer, such as, for example, hexafluorotitanic acid, hexafluorozirconic acid, phosphoric acid or phosphonic acids. Through the use of such ionic constituents or of compounds of conversion coatings that dissociate into ions in an aqueous environment, and/or through the use of ionic polymers, it is possible in particular to achieve activation of zinc flake primers. It is possible in this way in particular for zinc flake primers to exhibit significantly improved corrosion resistances in a water condensation test. While zinc flake primers exhibit outstanding corrosion resistances at the scribe mark in the salt spray test, for example, the resistance to water condensation is significantly reduced. Hot dip galvanized or electrogalvanized metal parts display comparable behaviour, probably attributable to the absence of electrolytes in the water condensation. As a result of the absence of electrolytes, the conductivity within the cured zinc flake primer is lowered, and the cathodic corrosion protection cannot be exhausted in accordance with its possibilities. Through the use of ionic constituents in a topcoat, more particularly in the second layer, however, the required electrolytes are provided, and overall an activation of the first layer is observed, meaning that significantly improved corrosion resistances may be achieved. The improvement in the corrosion resistances is probably attributable to formation of metal oxides, such as zinc oxide, for example, or of conversion products, more particularly phosphates, silicates, fluorides and oxides of zinc. The oxides and conversion products close the pores of the corrosion control coating and so improve the corrosion protection afforded by the coating.

With regard, now, to the substrate, it has been found appropriate if the substrate comprises at least one metal selected from aluminium and iron, preferably iron, or consists of alloys thereof. With particular preference the substrate consists of steel. The substrate in this case may consist of one or more parts, including in particular of composite materials, only some of which are coated with the coating system of the invention.

In the context of the present invention, provision is normally made for the first layer to be disposed between the second layer and the substrate.

Furthermore, in the context of the present invention, the second layer is generally applied directly on the first layer.

Preferably, therefore, the coating system of the invention forms a two-layer coating system applied directly to a metal surface, more particularly to a metallic substrate. Provision may also be made, however, for the coating system of the invention to be applied to a conversion coat which has been previously applied to the metal surface.

According to one particular embodiment of the present invention, the second layer may be applied to regions of the substrate not covered by the first layer. According to this particular embodiment of the present invention, therefore, the second layer extends beyond the first layer. This may be the case, for example, with substrates which consist of various materials and comprise, for example, plastic or wood as well as metal. With substrates of such kinds, it is typically only the metal part that is coated with the first layer, whereas the second layer may cover the entire substrate. It is also possible, furthermore, for cathodic corrosion protection to be intended to be achieved or to be required only with local limitation on metal parts, whereas at other sites on the substrate a merely corrosion-retarding effect by the second layer is sufficient or only temporary corrosion protection is required. Temporary corrosion protection, by which metal parts are protected, for example, during transport against marine climate or road dust, which often includes small amounts of road salt, has to date been provided using oils. A disadvantage of using oils, however, is that the metal part may need to undergo further cleaning and degreasing prior to use. This is particularly true of brake discs, whose braking surface is to be protected only temporarily, pending installation.

In the context of the present invention, it is further preferred if the coating system comprises two layers, and more particularly consists of two layers.

With regard, then, to the thickness of the coating system, it has been found appropriate if the coating system has a layer thickness in the range from 1 to 50 µm, more particularly 2 to 40 µm, preferably 4 to 30 µm, more preferably 5 to 25 µm, very preferably 10 to 20 µm.

The first layer of the coating system of the invention typically has a layer thickness in the range from 0.5 to 50 µm, more particularly 1 to 40 µm, preferably 3 to 28 µm, more preferably 5 to 20 µm, very preferably 7 to 15 µm.

With regard, then, to the layer thickness of the second layer, it is typically the case in the context of the present invention that the second layer has a layer thickness in the range from 0.5 to 20 µm, more particularly 0.5 to 15 µm, preferably 1 to 12 µm, more preferably 2 to 10 µm.

In the context of the present invention, accordingly, outstanding corrosion protection can be achieved with an extremely thin coating system comprising at least two layers. The thin two-layer coating systems according to the invention therefore have no adverse effects on the accuracy of fit of components.

Generally speaking, the first and second layers of the coating system of the invention are obtainable from corresponding coating compositions.

In this context, it may more particularly be the case that the first layer is obtained from a coating composition, more particularly a cathodic corrosion control composition, comprising (A) at least one binder and
(B) metal particles.

A binder in the context of the present invention—especially with regard to the first layer of the coating system of the invention—is a matrix former which, in particular after crosslinking and/or removal of the solvent, forms the inorganically based matrix of the first layer. The binder of the coating composition of the first layer is typically selected from silanes, polysilanes, silane hydrolysates, polysiloxanes, siliconates, titanates, polytitanates, zirconates and mixtures thereof. The aforesaid binders form three-dimensional networks, which may include fillers and also, in particular, metal particles.

Particularly good results are obtained in the context of the present invention if the binder is selected from silanes, silane hydrolysates, polysiloxanes, titanates, polytitanates and mixtures thereof.

Equally, particularly good results are obtained if the binder of the coating composition of the first layer is selected from titanates, polytitanates and mixtures thereof. If in the context of the present invention the binder is selected from titanates, polytitanates and mixtures thereof, it may be the case that the coating composition comprises up to 5 wt % of silanes, silane hydrolysates and/or polysiloxanes, based on the coating composition. Particularly preferred in this context is if the coating composition comprises the silane, silane hydrolysate and/or the polysiloxane in amounts of 0.5 to 5 wt %, preferably 2 to 5 wt %, based on the coating composition.

Titanate-based binder systems in particular cure rapidly and completely in the presence of water even at low temperatures.

If a titanate is used as binder in the context of the present invention, it has been found appropriate if the titanate is selected from titanium tetrabutoxide, titanium 2-ethylhexoxide and also polymeric butyl titanate and mixtures thereof. Particularly preferred for use here are mixtures of the three aforesaid titanates each in equal weight fractions.

Through the use of the silicon-based co-binders it is possible in particular to increase the flexibility of the resultant coatings.

According to one preferred embodiment of the present invention, the binder is selected from titanates, polytitanates and mixtures thereof in combination with silanes, silane hydrolysates and mixtures thereof.

If, in the context of the present invention, a polysiloxane is used as a constituent of the binder of the coating composition for the first layer, it has been found appropriate if the polysiloxane is selected from silanol-functionalized polysiloxanes and/or alkoxy-functionalized polysiloxanes and also mixtures thereof. Particularly good results are obtained in this context if the polysiloxane is selected from silanol- and alkoxy-functionalized alkylpolysiloxanes which comprise methyl and/or ethyl groups, and phenylpolysiloxanes. According to one preferred embodiment of the present invention, the polysiloxane is selected from silanol-functionalized and/or alkoxy-functionalized ethylpolysiloxanes, methylpolysiloxanes, phenylpolysiloxanes and mixtures thereof.

If, in the context of the present invention, a silane is used as a constituent of the coating composition for the first layer, it has been found appropriate if the silane is selected from the group of alkoxy-, acetoxy-, epoxy-, vinyl-, oxime-, mercapto- and amino-functionalized silanes, more particularly aminosilanes and/or alkoxysilanes, preferably alpha-aminoalkoxysilanes.

In this context it has been found appropriate if the silane is selected from silanes of the general formula I $$R_{4-n}SiX_n \qquad (I)$$

where
R=$C_1$ to $C_3$ alkyl, more particularly $C_1$ and/or $C_2$ alkyl;
  $C_6$ to $C_{15}$ aryl, more particularly $C_6$ to $C_{10}$ aryl;
  $C_2$ and/or $C_3$ olefin, more particularly vinyl;
  amine, more particularly $C_3$-$C_8$ alpha-amine;
X=alkoxy, more particularly $C_1$ to $C_6$ alkoxy, very preferably $C_1$ to $C_4$ alkoxy, especially preferably $C_1$ and/or $C_2$ alkoxy; and
n=2 or 3.

With regard, then, to the fraction of the binder in the coating composition of the first layer, it has been found appropriate if the coating composition comprises the binder in amounts of 2 to 60 wt %, more particularly 5 to 50 wt %, preferably 10 to 40 wt %, more preferably 15 to 30 wt %, based on the coating composition.

Furthermore, it is typically the case that the coating composition of the first layer comprises the metal particles in amounts of 40 to 95 wt %, more particularly 50 to 90 wt %, preferably 60 to 85 wt %, more preferably 70 to 80 wt %, based on the coating composition. The metal particles are more particularly the above-described platelet-shaped and/or granular, more particularly spherical, metal particles.

According to one preferred embodiment of the present invention, the coating composition of the first layer comprises at least one crosslinker. A crosslinker is a compound, more particularly an inorganic or inorganically based compound, which is incorporated into the matrix of the first layer and has a higher reaction rate than the binder system itself.

If the coating composition comprises a crosslinker, then the coating composition comprises the crosslinker typically in amounts of 0.1 to 10 wt %, more particularly 0.5 to 5 wt %, preferably 1 to 3 wt %, more preferably 1 to 2 wt %, based on the coating composition. Particularly good results are obtained if the crosslinker is selected from the group of silanes, titanates, zirconates, organometallic compounds, acids and bases and also mixtures thereof. It is particularly preferred in this context if the crosslinker is selected from titanates, zirconates, organometallic compounds, acids and bases and also mixtures thereof, more particularly titanates, zirconates, organometallic compounds and mixtures thereof.

If an organometallic compound is used as crosslinker in the context of the present invention, it has been found appropriate if the organometallic compound is selected from organometallic compounds, more particularly alkoxides, of boron, aluminium, iron, zinc and tin and also mixtures thereof.

Equally, very good results are obtained if the silanes, titanates and zirconates used as crosslinkers are selected from diorganyldialkoxytitanates, diorganyldialkoxyzirconates, organyltrialkoxysilanes, organyltrialkoxytitanates, organyltrialkoxyzirconates, tetraalkoxysilanes, tetraalkoxytitanates, tetraalkoxyzirconates and mixtures thereof.

In this context it is typically the case that the organyl substituents are selected from alkyl, phenyl and vinyl. The organyl substituents are preferably selected from ethyl, methyl, phenyl and vinyl. Particularly good results are achieved if the crosslinkers are selected from tetrabutyltitanate, titanium tetraisopropoxide, vinyl tri-n-butyl titanate and mixtures thereof.

According to one preferred embodiment of the present invention, the coating composition for producing a cathodic corrosion control coating, more particularly the coating composition of the first layer, comprises
(A) at least one binder,
(B) metal particles and
(C) at least one crosslinker.

In the context of the present invention, it is typically the case that the coating composition of the first layer is free from water, more particularly at least substantially free from water, preferably free from water.

Furthermore, it may be the case that the coating composition of the first layer comprises at least one solvent.

If the coating composition of the first layer comprises a solvent, it has been found appropriate if the coating composition comprises the solvent in amounts of less than 20 wt %, more particularly less than 15 wt %, preferably less than 10 wt %, more preferably less than 6 wt %, based on the coating composition. Equally it may be the case that the coating composition comprises the solvent in amounts of 1 to 20 wt %, more particularly 2 to 15 wt %, preferably 3 to 10 wt %, more preferably 4 to 6 wt %, based on the coating composition.

As solvents, more particularly organic solvents, it is possible to use all organic solvents. Especially suitable are aromatic and aliphatic hydrocarbons and also polar organic solvents, such as, for example, acetone, alcohols, more particularly $C_1$ to $C_{20}$ alcohols, preferably $C_2$ to $C_{10}$ alcohols, more preferably $C_2$ to $C_8$ alcohols, nitriles or nitro compounds. To ensure very rapid curing of the coating composition, the solvents typically have a boiling point of less than 120° C., more particularly less than 100° C.

According to yet a further preferred embodiment of the present invention, the coating material for producing a cathodic corrosion control coating, more particularly of the first layer, therefore comprises
(A) at least one binder,
(B) metal particles,
(C) at least one crosslinker and
(D) at least one solvent.

Furthermore, in the context of the present invention, it may equally be the case that the coating composition comprises at least one thickener and/or a rheological additive.

If the coating composition comprises a thickener and/or a rheological additive, it is typically the case that the coating composition comprises the thickener and/or the rheological additive in amounts of 0.01 to 5 wt %, more particularly 0.05 to 3 wt %, preferably 0.1 to 2 wt %, based on the coating composition. The thickeners and rheological additives may for example be ethylcellulose or silica, more particularly fumed silica.

According to one preferred embodiment of the present invention, the rheological additive and/or the thickener is used as component (E) of the coating composition.

Furthermore, in the context of the present invention, it may be the case that the coating composition comprises at least one wetting agent. If, in the context of the present invention, the coating composition comprises a wetting agent, it has been found appropriate if the coating composition comprises the wetting agent in amounts of 0.01 to 5 wt %, more particularly 0.05 to 3 wt %, preferably 0.1 to 2 wt %, based on the coating composition.

If in the context of the present invention the coating composition comprises a wetting agent, the latter is used preferably as component (F) of the coating material.

In the context of the present invention, therefore, it is preferred if the coating composition for producing a cathodic corrosion control coating, more particularly of the first layer, comprises
(A) at least one binder,
(B) metal particles,
(C) at least one crosslinker,
(D) solvents,
(E) at least one rheological additive and/or a thickener and
(F) at least one wetting agent.

Furthermore, in the context of the present invention, it may equally be the case that the coating composition of the first layer comprises further additives, selected more particularly from the group of preservatives, stabilizers, acids and/or bases, defoaming components, film formers, flow control agents, fillers, pH stabilizers and pH modifiers.

If the coating composition does comprise further additives, then the coating composition comprises further additives typically in amounts of 0.01 to 5 wt %, more particularly 0.05 to 3 wt %, preferably 0.1 to 2 wt %, based on the coating composition. All further additives are used more particularly as component (G) of the coating composition.

In the context of the present invention, particularly good results are obtained if the coating composition of the first layer has a Brookfield dynamic viscosity at 20° C. in the range from 2 to 10 000 mPas, more particularly 5 to 1000 mPas, preferably 5 to 500 mPas, more preferably 10 to 100 mPas, very preferably 30 to 50 mPas. The coating composition of the first layer, more particularly of the cathodic corrosion control coating, may therefore be applied to the substrate by all suitable application methods, including in particular by spraying, rolling, knifecoating, dipping, more particularly dip-spincoating. Preferably, however, the coating composition is applied by means of spraying.

With regard, then, to the layer thickness with which the coating composition of the first layer is applied to the substrate, it has been found appropriate if the coating composition of the first layer is applied with a layer thickness of 0.5 to 50 μm, more particularly 1 to 40 μm, preferably 3 to 28 μm, more preferably 5 to 20 μm, very preferably 7 to 15 μm, being applied more particularly to the substrate.

With regard, then, to the second layer of the coating system of the invention, it has been found appropriate if the second layer is obtained from a coating composition, more particularly from a topcoat composition, comprising
(A) at least one hydrophilic, inorganic or organic, polymeric compound or a hydrophobic, organic compound and
(B) water.

As already observed above, it is particularly preferred in the context of the present invention if the coating composition of the second layer, more particularly the topcoat composition, comprises hydrophilic, inorganic or organic, polymeric compounds. It is particularly preferred in this context if the hydrophilic, inorganic or organic, polymeric compounds not only are hydrophilic, i.e. polar, but also, furthermore, comprise ionic fractions, since in this way it is possible to improve significantly the corrosion control effect particularly of zinc flake primers.

The use of hydrophobic organic compounds in aqueous dispersions serves, in contrast, solely for the curing of the coating composition of the first layer, more particularly of the cathodic corrosion control composition; the hydrophobic organic compound which remains on the first layer and also, possibly, on the substrate enables a certain passivation of the surface to which it has been applied. In this context, the hydrophobic organic compounds are preferably dispersed with the aid of emulsifiers, or self-emulsifying systems are used.

Typically, it is the case that the coating composition of the second layer, i.e. the topcoat composition, comprises the hydrophilic, inorganic or organic, polymeric compound or the hydrophobic organic compound in amounts of 3 to 50 wt %, more particularly 5 to 40 wt %, preferably 10 to 30 wt %, more preferably 15 to 25 wt %, based on the coating composition. In this context it is also possible in particular to use mixtures of the afore-defined hydrophilic, inorganic or organic, polymeric compounds or hydrophobic organic compounds.

Equally, in the context of the present invention, it may be the case that the coating composition for generating the second layer, more particularly the topcoat composition, comprises water in amounts of 50 to 97 wt %, more particularly 60 to 95 wt %, preferably 70 to 90 wt %, more preferably 75 to 85 wt %, based on the coating composition.

Furthermore, in the context of the present invention, it may be the case that the coating composition for generating the second layer, more particularly the topcoat composition, comprises further ionic constituents. Ionic constituents in the context of the present invention are compounds or parts of compounds which dissociate into ionic compounds on contact with water. Examples include inorganic or organic acids and salts. Particularly preferred for use—as already observed above—are compounds which are also used in compositions for conversion treatments, more particularly hexafluorotitanic acid, hexafluorozirconic acid, phosphonic acid and/or phosphoric acid.

Especially when using organic coatings, the ionic constituents are incorporated into the coating composition of the second layer and activate the cathodic corrosion control coating, more particularly zinc flake primers, since, on contact with water, electrolyte solutions are generated and there is therefore electrical conductivity. It is preferred, however, if the polymer comprises ionic groups.

If the coating composition of the second layer, more particularly the topcoat composition, comprises additional ionic constituents, then the coating composition comprises the ionic constituents in amounts of 0.01 to 10 wt %, more particularly 0.1 to 5 wt %, preferably 0.2 to 2 wt %, more preferably 0.5 to 1 wt %, based on the coating composition.

Furthermore, it may also be the case that the coating composition of the second layer comprises additives. If the coating composition of the second layer, more particularly the coating composition, comprises additives, it has been found appropriate if the topcoat composition comprises the additives in amounts of 0.01 to 10 wt %, more particularly 0.05 to 5 wt %, preferably 0.1 to 2 wt %, based on the coating composition.

With regard, then, to the nature of the additives, it is possible to use all suitable additives. Typically, however, the additives are selected from the group of rheological additives, preservatives, stabilizers, acids and/or bases, surfactants, defoaming components, film formers, organic UV absorbers, active biogenic ingredients, flow control agents, wetting agents, fillers, pH stabilizers, and pH modifiers.

With regard, then, to the viscosity of the coating composition for generating the second layer, more particularly the topcoat composition, it may vary within wide ranges. The coating composition typically has a Brookfield dynamic viscosity at 20° C. in the range from 2 to 5000 mPas, more particularly 5 to 1000 mPas, preferably 5 to 500 mPas, more preferably 10 to 100 mPas, very preferably 30 to 50 m Pas. The viscosity of the coating composition of the second layer, more particularly of the topcoat composition, is preferably designed such that the coating composition can readily be applied by spray application and more particularly can be finely atomized. Fine atomization generates a high fraction of microscopically small droplets, which lead to accelerated curing of the first layer of the coating system of the invention.

According to one preferred embodiment of the present invention, the coating composition of the second layer, more particularly the topcoat composition, has a pH in the acidic or in the alkaline range. Particularly good results are obtained in this context if the coating composition has a pH of less than 6.5, more particularly less than 6, preferably less than 5, or a pH of greater than 7.5, preferably greater than 8, more preferably greater than 10. Equally it may be the case that the coating composition has a pH in the range from 0.5 to 6.5, more particularly 1 to 6, preferably 2 to 5, or a pH in the range from 7.5 to 13.5, more particularly 8 to 13, preferably 10 to 12. By means of a pH value within the acidic or alkaline range it is also possible in particular to carry out incipient etching, and therefore activation, of the metal particles embedded in the surface of the first layer. Furthermore, amphoteric zinc oxide is partially dissolved, and the formation of conversion coats is promoted. This leads to a significantly improved corrosion control coating.

With regard, then, to the layer thickness with which the coating composition of the second layer, more particularly the topcoat composition, is applied, it may vary within wide ranges. Typically, however, it is the case that the coating composition of the second layer is applied with a lower layer thickness than the coating composition of the first layer.

Generally speaking, the coating composition of the second layer is applied with a layer thickness of 0.5 to 15 µm, more particularly 0.5 to 10 µm, preferably 1 to 6 µm, more preferably 2 to 5 µm, very preferably 2 to 4 µm, being applied more particularly to the first layer and/or to the substrate.

Figure 2:
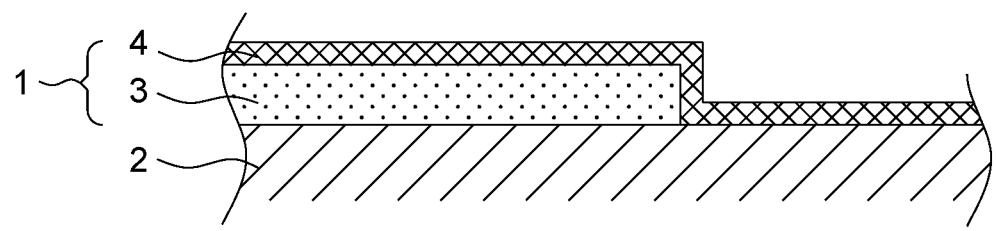
FIG. 2: provides a coating system according to the novel technology disclosed providing a substrate having two layers, wherein the first layer only partially covers the substrate.

FIG. 1 shows a schematic representation of the coating system of the invention, applied to a substrate, and FIG. 2 shows a schematic representation of a coating system of the invention, applied to a substrate, where the first layer covers only parts of the substrate and the second layer covers both the substrate and the first layer.

A further subject of the present invention—according to a second aspect of the present invention—is a method for producing a coating system, more particularly a corrosion control coating system, preferably as described above, for generating cathodic corrosion protection on a metallic substrate, where (A) in a first method step, a first coating composition, more particularly a first, at least substantially anhydrous coating composition which crosslinks on exposure to water, more particularly for generating a cathodic corrosion control coating, is applied to a metallic substrate, to form a first layer, and (B) in a second method step, which follows the first method step (A), an aqueously based second coating composition is applied to the first layer.

In the context of the present invention, it is the case in particular that in the second method step (B) the aqueously based second coating composition, more particularly the above-described topcoat composition, is applied to the first layer, more particularly to the above-described corrosion control coating composition. The coating compositions for the first or the second layer correspond to the coating compositions described in connection with the coating system of the invention.

In the context of the present invention, moreover, it is equally preferably the case that the first coating composition in method step (A) is applied directly to a metallic substrate, being applied more particularly at least partially, i.e. with local limitation. However, according to one particular embodiment of the present invention, it may be the case that the metallic substrate has undergone a conversion treatment beforehand, and is therefore coated with a conversion coat. In that case, the first layer of the coating system of the invention is applied to the conversion coat.

As already observed above equally in connection with the coating system of the invention, it may further be the case that in method step (B) the second layer, more particularly the second coating composition, is applied not solely to the first layer, i.e. to the layer applied in method step (A), but also, optionally, to parts of the substrate to which the coating composition for generating a cathodic corrosion control coating, i.e. the first layer, was not applied.

With regard, then, to the application of the first coating composition of the first layer, it is typically accomplished by roller coating, rolling, knifecoating, dipping, dip-spincoating, brushing, spraying. It is particularly preferred in this context if the first coating composition is applied by dipping, dip-spincoating or spraying, preferably spraying. Particularly good results are obtained in this context if the first coating composition is applied to the substrate with the layer thicknesses described in connection with the first aspect of the invention.

According to one preferred embodiment of the present invention, in method step (A), after application of the first coating composition, the first coating composition is heated to temperatures of less than 100° C., more particularly less than 90° C., preferably less than 80° C.

Equally it may be the case that in method step (A) after application of the first coating composition, the first coating composition is heated to temperatures of 20 to 100° C., more particularly 30 to 90° C., preferably 50 to 80° C.

In the context of the present invention it is possible, and according to one particular embodiment of the present invention it is also preferred, if the first coating composition is cured or crosslinked in the temperature range between 5 and 30° C. This embodiment is particularly advantageous especially for the mobile application of the coating system of the invention.

By heating of the substrate and of the first coating composition to temperatures of less than 100° C., however, solvent fractions, for example, which are present in the coating composition for the purpose of adjusting the viscosity are removed, and the crosslinking of the first coating composition is initiated even at this stage. On application of the second coating composition to the first coating composition, which has then been heated, on the one hand the crosslinking rate of the first coating composition is significantly increased, and on the other hand the water present in the second coating composition—in particular, excess water, which is not needed for the curing of the first coating composition—also evaporates directly and need not first be removed. Additionally, a high atmospheric humidity is established in the immediate vicinity of the coating surface, and promotes rapid curing or crosslinking of the first layer. Heating of the first coating composition and/or of the substrate therefore results in a simplification, in process engineering terms, to the method of the invention, and more particularly allows the drying time—that is, the time for curing or crosslinking of the first and second coating compositions—to be reduced significantly, thereby enabling a saving in storage capacities.

With regard, then, to the application of the second coating composition, it may be applied by any suitable technique to the first layer and/or to the substrate. Typically, the second coating composition is applied to the first layer and/or to the substrate by roller coating, rolling, knifecoating, dipping, dip-spincoating, brushing or spraying. In the context of the present invention, however, it has been particularly preferred if the second coating composition is applied by spraying, especially to the first layer and/or to the substrate. Spray application of the second coating composition generates finely divided water droplets and water vapour, which leads to particularly rapid curing and crosslinking of the first coating composition.

The second coating composition is applied in particular with the aforesaid layer thicknesses to the first layer and/or to the substrate.

Generally speaking, in the context of the present invention, it is the case that in method step (B), after application of the second coating composition, the first coating composition is crosslinked on exposure to water, more particularly moisture, preferably atmospheric moisture. The particular feature of the method of the invention is to be seen, among others, in the fact that by the use of a second aqueous coating composition, the moisture for crosslinking the first coating composition is provided by the coating system itself and it is not necessary, for example, for the coated substrate to be kept in specially conditioned spaces for the purpose of curing.

For further details of this aspect of the invention, reference may be made to the observations above concerning the first aspect of the invention, which apply mutatis mutandis in relation to the method of the invention.

Yet a further subject of the present invention—according to a third aspect of the present invention—is a metallic substrate comprising an above-described coating system and/or obtainable by the above-described method.

For further details of this aspect of the invention, reference may be made to the observations above concerning the other aspects of the invention, which apply mutatis mutandis in relation to the metallic substrate of the invention.

Yet a further subject, finally—according to a fourth aspect of the present invention—is a kit for producing an above-described coating system, comprising a first coating composition, more particularly a cathodic corrosion control coating composition, as described above, and a second coating composition, more particularly a topcoat composition, as described above.

For further details of this aspect of the invention, reference may be made to the observations above concerning the other aspects of the invention, which apply mutatis mutandis in relation to the kit of the invention.

The subject matter of the present invention is elucidated hereinafter with reference to the description of figures and also to the working examples, the elucidation being non-limiting and exemplary in reference to preferred embodiments.

The figure representations show, according to FIG. 1, a coating system 1 of the invention, applied on a metallic substrate 2. The coating system 1 has a first layer 3, which is applied directly to the substrate, and a second layer 4, which is applied to the first layer.

The first layer 3 is obtained preferably from an anhydrous coating composition comprising metal platelets, more particularly from a zinc flake primer, and takes the form of an inorganic matrix with metal platelets, preferably zinc lamellae, embedded therein.

The second layer 4 consists preferably of a cationically stabilized polymeric binder based on polyurethanes and polyacrylates, and is obtained preferably from an aqueous dispersion of the polymeric binder that has a pH in the acidic or alkaline range. Through the use of a cationically stabilized polymeric binder in layer 4, the metal particles become accessible in the layer 3 and/or become accessible for corrosion control, thereby increasing the corrosion protection afforded by the coating system 1.

FIG. 2 shows a particular embodiment of the coating system 1 of the invention, applied on a metallic substrate 2. The coating system 1 has a two-layer construction, with a first layer 3 having been applied to parts of the substrate 2 and at least partly covering it.

The second layer 4 possesses a greater extent than the first layer 3, and is applied both on the first layer 3 and on the substrate 2. The first layer 3 and the second layer 4 correspond, furthermore, to the layers described previously. The second layer 4, which is obtained from an aqueous coating composition, enables rapid curing of the first layer 3, but also, furthermore, affords improved corrosion protection, not based on a cathodic corrosion control effect, for the substrate 2, at the locations where the first layer 1 is not applied.

This embodiment is used especially when the substrate consists of composite materials and comprises, for example, wood components or plastics components. Furthermore, this embodiment is also applied to a multitude of cast parts for which full-area cathodic corrosion protection need not be ensured, such as in the case of wheel hubs or brake discs, for example.

The subject matter of the present invention is further illustrated non-limitingly hereinafter with reference to the working examples.

WORKING EXAMPLES

1. Coated Steel Sheets

The performance of the coating system of the invention is elucidated below in reference to coated steel sheets.

For this purpose, DC04 steel sheets are subjected to alkaline degreasing at 60° C. using the C72 Cleaner from Henkel AG & Co. KGaA and, after rinsing and drying, are coated with a respective zinc flake primer—also called basecoat below. The basecoat formulations 1 to 14 used are specified in Tables 2 to 5.

The zinc flake primer is applied by spray application with a layer thickness of around 15 µm to the steel sheet and then dried at 70° C. for 30 minutes.

After that, one of the aqueous topcoat formulations A to J is applied by spray application to the steel sheets coated with the zinc flake primers, resulting in a dry film layer thickness of around 3 µm. The topcoat formulations A to J are specified in Tables 6 to 8.

The materials used for the basecoats and topcoats are specified in Table 1.

TABLE 1

Materials used

| Material | Specification |
|---|---|
| Polysiloxane system | Silanol-terminated polydimethylsiloxane DMS-S12 from Gelest Inc. |
| Crosslinkers | Tetra-n-butyl titanate, aminosilanes |
| Zinc dust | Umicore Metalle & Oberflächen GmbH |
| Zinc flake | 4ZnAl7 from Eckart GmbH |
| Solvent | Solvesso 100, n-butanol |
| Wetting agent | DISPERBYK-190 from BYK-Chemie GmbH |
| Thickener | M-P-A 4020 X5 from Elementis Specialties |
| Na waterglass[1] | 37/40 from BASF SE |
| K waterglass[1] | 28/30 from BASF SE |
| Li waterglass[1] | Li-Polysilicate from Sigma Aldrich |
| Deion, water[1] | Deionized water |
| Wax/fatty acid[1] | Aquacer PE waxes from BYK-Chemie GmbH/stearic acid |
| Polymeric binder[1] | Aqueous PU dispersion, 50 wt % solids fraction |
| Polyacrylic acid[1] | Water-soluble polyacrylic acids $M_w$ 2000-10 000 |
| Silica sol[1] | Levasil grades from AkzoNobel |
| Silane hydrolysate[1] | Hydrolsi 2776 from Evonik Industries AG |

The coated steel sheets are then subjected to various tests, namely a paper towel abrasion test, an adhesive tape removal test, a salt spray test at the scribe mark (scribing down to steel, 0.5 mm scribe width) until red rust occurs, and a condensation climate test at the scribe mark until red rust occurs. The results are reproduced in Tables 9 to 12. For comparison in each case, one example without topcoat and one with a topcoat based on a solvent-borne epoxy resin varnish are conducted.

TABLE 2

Basecoat formulations

| | Formulation | | | |
|---|---|---|---|---|
| | 1 | 2 | 3 | 4 |
| Binder[1] | 36.5 | 36.5 | 29 | 28 |
| Polysiloxane system | | | | |
| Crosslinker[1] | 1.5 | 1.5 | 1.0 | 1.0 |
| Zinc dust[1] | 60 | 60 | 70 | 70 |
| Zinc flake[1] | 2 | 2 | — | 1 |
| Solvent[1] | — | — | — | — |
| Wetting agent[1] | — | — | — | — |
| Thickener[1] | — | — | — | — |

[1]Figures in wt %

TABLE 3

Basecoat formulations

| | Formulation | | | |
|---|---|---|---|---|
| | 5 | 6 | 7 | 8 |
| Binder[1] | 10 | 15 | 14 | 10 |
| Polysiloxane system | | | | |
| Crosslinker[1] | 5 | 1.5 | 1.4 | 0.8 |
| Zinc dust[1] | 83 | 81.5 | 77 | 88.5 |
| Zinc flake[1] | 2 | 2 | 2 | 0.7 |
| Solvent[1] | — | — | 5.6 | — |
| Wetting agent[1] | — | — | — | — |
| Thickener[1] | — | — | — | — |

[1]Figures in wt %

TABLE 4

Basecoat formulations

| | Formulation | | | |
|---|---|---|---|---|
| | 9 | 10 | 11 | 12 |
| Binder | 20.8 | 31 | 17.5 | 21.0 |
| Titanate Crosslinker | — | — | — | — |
| Zinc dust | 56.3 | — | 54.7 | 62.6 |
| Zinc flake | — | 52.6 | — | 3.6 |
| Solvent | 21.15 | 15.7 | 25.5 | 11 |
| Wetting agent | 1.0 | 0.2 | 0.9 | 1.8 |
| Thickener | 0.75 | 0.5 | 1.4 | — |

[1]Figures in wt %

TABLE 5

Basecoat formulations

| | Formulation | |
|---|---|---|
| | 13 | 14 |
| Binder[1] | 21.8 | 22.5 |
| Polysiloxane system | | |
| Crosslinker[1] | — | — |
| Zinc dust[1] | — | — |
| Zinc flake[1] | 51.3 | 63.2 |
| Solvent[1] | 24.1 | 10.8 |
| Wetting agent[1] | 1.4 | 1.5 |
| Thickener[1] | 1.4 | 2 |

[1]Figures in wt %

TABLE 6

Topcoat formulations

| | Formulation | | | |
|---|---|---|---|---|
| | A | B | C | D |
| Na waterglass[1] | — | — | — | 10 |
| K waterglass[1] | — | — | 10 | — |
| Li waterglass[1] | 10 | 10 | — | — |
| Water (deionized)[1] | 75 | 90 | 90 | 90 |
| Wax/fatty acid[1] | — | — | — | — |
| Polymeric binder[1] | — | — | — | — |
| Polyacrylic acid[1] | — | — | — | — |
| Silica sol[1] | — | — | — | — |
| Silane hydrolysate[1] | 15 | — | — | — |

[1]Figures in wt %

TABLE 7

Topcoat formulations

| | Formulation | | | |
|---|---|---|---|---|
| | E | F | G | H |
| Na waterglass[1] | — | 9.5 | — | — |
| K waterglass[1] | 6 | — | — | — |
| Li waterglass[1] | — | — | — | — |
| Deion. water[1] | 68.5 | 76.5 | 80 | 79.9 |
| Wax/fatty acid[1] | 4 | 2 | 20 | 20 |
| Polymeric binder[1] | 12.5 | — | — | — |
| Polyacrylic acid[1] | — | — | — | 0.1 |
| Silica sol[1] | — | — | — | — |
| Silane hydrolysate[1] | 9 | 12 | — | — |

[1]Figures in wt %

TABLE 8

Topcoat formulations

| | Formulation | |
|---|---|---|
| | I | J |
| Na waterglass[1] | — | — |
| K waterglass[1] | — | — |
| Li waterglass[1] | — | — |
| Deion. water[1] | 80 | 77.5 |
| Wax/fatty acid[1] | — | — |
| Polymeric binder[1] | 20 | 20 |
| Polyacrylic acid[1] | — | — |
| Silica sol[1] | — | 2.5 |
| Silane hydrolysate[1] | — | — |

[1]Figures in wt %

In Tables 9 to 12, + and − for the various tests denote the following:

a) Paper towel abrasion:
- − distinct abrasion, visible dark discoloration, residue on towel
- + very slight abrasion or none on paper towel b) Adhesive tape removal:
- − basecoat remains partially on Tesafilm adhesive tape, after cohesive fracture in the basecoat film; dark discoloration on Tesafilm
- + perceptible improvement relative to system without topcoat; removal possibly still perceptible after cohesive fracture, but less so, through to only minimal detachment c) Salt spray test at the scribe mark to red rust:
- − <200 h
- + >>720 h d) Condensation climate at the scribe mark to red rust:
- − <200 h
- + >200 h or improvement by at least 30% relative to system without topcoat at same basecoat layer thickness

TABLE 9

Test results for various combinations of basecoats (BC) and topcoats (TC): paper towel abrasion, adhesive tape removal, salt spray test at the scribe mark to RR[2], condensation climate test at the scribe mark to RR[2]

| | BC 1 | BC 2 | BC 3 | BC 4 |
|---|---|---|---|---|
| No TC (comparative) | −, −, +, − | −, −, +, − | −, −, +, − | −, −, +, − |
| Epoxy TC (comparative)[1] | +, −, −, − | +, −, −, − | +, −, −, − | +, −, −, − |
| TC A | +, −, +, + | +, −, +, + | +, −, +, + | +, −, +, + |
| TC B | +, −, +, + | +, −, +, + | +, −, +, + | +, −, +, + |
| TC C | +, −, +, + | +, −, +, + | +, −, +, + | +, −, +, + |
| TC D | +, −, +, + | +, −, +, + | +, −, +, + | +, −, +, + |
| TC E | +, +, +, + | +, +, +, + | +, +, +, + | +, +, +, + |
| TC F | +, +, +, + | +, +, +, + | +, +, +, + | +, +, +, + |
| TC G | +, +, +, − | +, +, +, − | +, +, +, − | +, +, +, − |
| TC H | +, +, +, + | +, +, +, + | +, +, +, + | +, +, +, + |
| TC I | +, −, +, + | +, −, +, + | +, −, +, + | +, −, +, + |
| TC J | +, −, +, + | +, −, +, + | +, −, +, + | +, −, +, + |

[1]Solvent-borne epoxy resin varnish
[2]RR = red rust

TABLE 10

Test results for various combinations of basecoats (BC) and topcoats (TC): paper towel abrasion, adhesive tape removal, salt spray test at the scribe mark to RR[2], condensation climate test at the scribe mark to RR[2]

| | BC 5 | BC 6 | BC 7 | BC 8 |
|---|---|---|---|---|
| No TC (comparative) | −, −, +, − | −, −, +, − | −, −, +, − | −, −, +, − |
| Epoxy TC (comparative)[1] | +, −, −, − | +, −, −, − | +, −, −, − | +, −, −, − |
| TC A | +, −, +, + | +, −, +, + | +, −, +, + | +, −, +, + |
| TC B | +, −, +, + | +, −, +, + | +, −, +, + | +, −, +, + |
| TC C | +, −, +, + | +, −, +, + | +, −, +, + | +, −, +, + |
| TC D | +, −, +, + | +, −, +, + | +, −, +, + | +, −, +, + |
| TC E | +, +, +, + | +, +, +, + | +, +, +, + | +, +, +, + |
| TC F | +, +, +, + | +, +, +, + | +, +, +, + | +, +, +, + |
| TC G | +, +, +, − | +, +, +, − | +, +, +, − | +, +, +, − |
| TC H | +, +, +, + | +, +, +, + | +, +, +, + | +, +, +, + |
| TC I | +, −, +, + | +, −, +, + | +, −, +, +, + | +, −, +, + |
| TC J | +, −, +, + | +, −, +, + | +, −, +, +, + | +, −, +, + |

[1]Solvent-borne epoxy resin varnish
[2]RR = red rust

TABLE 11

Test results for various combinations of basecoats (BC) and topcoats (TC): paper towel abrasion, adhesive tape removal, salt spray test at the scribe mark to RR[2], condensation climate test at the scribe mark to RR[2]

| | BC 9 | BC 10 | BC 11 | BC 12 |
|---|---|---|---|---|
| No TC (comparative) | −, −, +, − | −, −, +, − | −, −, +, − | −, −, +, − |
| Epoxy TC (comparative)[1] | +, −, −, − | +, −, −, − | +, −, −, − | +, −, −, − |
| TC A | +, −, +, + | +, −, +, + | +, −, +, + | +, −, +, + |
| TC B | +, −, +, + | +, −, +, + | +, −, +, + | +, −, +, + |
| TC C | +, −, +, + | +, −, +, + | +, −, +, + | +, −, +, + |
| TC D | +, −, +, + | +, −, +, + | +, −, +, + | +, −, +, + |
| TC E | +, +, +, + | +, +, +, + | +, +, +, + | +, +, +, + |
| TC F | +, +, +, + | +, +, +, + | +, +, +, + | +, +, +, + |
| TC G | +, +, +, − | +, +, +, − | +, +, +, − | +, +, +, − |
| TC H | +, +, +, + | +, +, +, + | +, +, +, + | +, +, +, + |
| TC I | +, −, +, + | +, −, +, + | +, −, +, + | +, −, +, + |
| TC J | +, −, +, + | +, −, +, + | +, −, +, + | +, −, +, + |

[1]Solvent-borne epoxy resin varnish
[2]RR = red rust

TABLE 12

Test results for various combinations of basecoats (BC) and topcoats (TC): paper towel abrasion, adhesive tape removal, salt spray test at the scribe mark to RR[2], condensation climate test at the scribe mark to RR[2]

| | BC 13 | BC 14 |
|---|---|---|
| No TC (comparative) | −, −, +, − | −, −, +, − |
| Epoxy TC (comparative)[1] | +, −, −, − | +, −, −, − |
| TC A | +, −, +, + | +, −, +, + |
| TC B | +, −, +, + | +, −, +, + |
| TC C | +, −, +, + | +, −, +, + |
| TC D | +, −, +, + | +, −, +, + |
| TC E | +, +, +, + | +, +, +, + |
| TC F | +, +, +, + | +, +, +, + |
| TC G | +, +, +, − | +, +, +, − |
| TC H | +, +, +, + | +, +, +, + |
| TC I | +, −, +, + | +, −, +, + |
| TC J | +, −, +, + | +, −, +, + |

[1]Solvent-borne epoxy resin varnish
[2]RR = red rust

It is apparent that the comparative example coated only with a basecoat and not with a topcoat exhibits significantly higher abrasion in the abrasion test with the paper towel and yields significantly poorer values in the adhesive tape removal as well. Corrosion protection in the salt spray test at the scribe mark is consistently very good for the steel sheet provided only with a basecoat: cathodic corrosion protection of more than 1000 hours before the appearance of red rust is observed. The condensation climate test yields values which in each case are acceptable, but is significantly poorer than for two-layer coatings, especially in the case of using topcoats with ionic fractions.

The second comparative example, with an epoxy resin-based topcoat, displays a significantly improved abrasion resistance in the abrasion test with a paper towel, but equally very poor values in the adhesive tape removal test. The test results in the salt spray test at the scribe mark are poorer than in the case of the systems coated only with a basecoat, this being attributable to the lack of activation of the zinc lamellae by electrolytes. In the condensation climate test at the scribe mark, the systems coated with an epoxy resin-based topcoat display properties similarly poor to those of systems without a topcoat. The examples according to the invention, in contrast, consistently exhibit significantly better properties.

2. Coating of Brake Discs

Six brake discs are subjected to alkaline cleaning at 65 to 70° C. for 15 minutes, after which they are rinsed and dried with pulses of air from an air blower. For the partial coating of the brake discs, the circle of holes is taped off in each case with a specific adhesive tape which does not leave any adhesive residue behind.

This is followed by the spray gun coating of the six brake discs with a basecoat of the formulation 10 specified above in Table 3, in a layer thickness of around 10 μm. The brake discs are dried at 80° C. for 30 minutes and subsequently cooled to hand temperature using an air blower.

In the next step, the entire surface of the brake discs, including the circle of holes, is coated with an aqueously based topcoat.

For further coating of the brake discs, the topcoat formulation A specified above in Table 5, and also two further topcoat formulations K and L, are used. Topcoat formulation K is an aqueously based polymer suspension based on polyurethane and polyacrylates, and contains small amounts of hexafluorotitanic acid.

Topcoat L consists of the polymeric binder system of topcoat K, but without further additions.

The topcoat compositions are applied by spray application with a layer thickness of 2 to 4 μm over the entire area of the brake discs.

The brake discs are subsequently subjected to a neutral salt spray test and the result is documented after 2 hours, 4 hours, 6 hours and 24 hours. The results of the neutral salt spray test are summarized in Table 13.

It is found that the polymeric coatings K and L achieve significantly better results than the pure waterglass coating of topcoat A. In particular, red rust is observed after just 2 hours, to an extent which is already considerable, on those surfaces of the brake discs that are not equipped with cathodic corrosion protection, when using topcoat A. Topcoat formulation K, i.e. the polymeric binder which also includes ionic constituents, namely hexafluorotitanic acid, initially displays a slight, and later on a pronounced, homogeneous yellowing of the part of the disc coated only with the topcoat. This represents red rust occurring uniformly and weakly, which, however, is not perceptible as such to the naked eye. The first larger red rust spots on the surface not equipped with cathodic corrosion protection become visible only after 24 hours.

The best results are provided by the polymeric topcoat system of topcoat formulation L: here, while initial red rust is likewise apparent after 2 hours, it is only extremely small in area and sporadic in its manifestation. Only after 24 hours is there a significantly perceptible manifestation of red rust.

TABLE 13

Results for the coated brake discs in the neutral salt spray test; topcoat layer thickness: 2 to 4 μm

| Duration | Topcoat A | Topcoat K | Topcoat L |
|---|---|---|---|
| 2 h | Red rust on the clearcoat-coated surface. | Yellowing on the clearcoat-coated surface, but no red rust. | Sporadic red rust on the clearcoat-coated surface. |
| 4 h | Red rust on the clearcoat-coated surface. | Yellowing on the clearcoat-coated surface, but no red rust. | Sporadic red rust on the clearcoat-coated surface. |
| 6 h | Increased red rust on the surface coated only with clearcoat. | Yellowing on the clearcoat-coated surface, but no red rust. | Sporadic red rust on the clearcoat-coated surface. |
| 24 h | Red rust on the entire surface coated only with clearcoat. | Red rust formed from the yellowing on the clearcoat-coated surface. | Sporadic red rust on the clearcoat-coated surface. |

The test described above is repeated, but with the topcoats applied by twofold application with a layer thickness of 4 to 8 μm. The results are compiled in Table 14.

TABLE 14

Results for the coated brake discs in the neutral salt spray test; topcoat layer thickness: 8 μm

| Duration | Topcoat A | Topcoat K | Topcoat L |
|---|---|---|---|
| 2 h | Red rust on the clearcoat-coated surface | No red rust, brake disc unchanged | No red rust, brake disc unchanged |
| 4 h | Red rust on the clearcoat-coated surface | No red rust, brake disc unchanged | No red rust, brake disc unchanged |
| 6 h | Increased red rust on the surface coated only with clearcoat | Yellowing on the clearcoat-coated surface, but no red rust. | No red rust, brake disc unchanged |
| 24 h | Severe red rust, increasing further over the course of the salt spray test | Red rust partially on parts of the surface coated only with topcoat (<20%) | No red rust on the surface coated only with topcoat, but RR run traces from the uncoated edges and bores/holes |
| 48 h | Severe red rust, increasing further over the course of the salt spray test | Local red rust on parts of the surface coated only with topcoat (<25%) | No red rust on the surface coated only with topcoat, but RR run traces from the uncoated edges and bores/holes |
| 72 h | Severe red rust, increasing further over the course of the salt spray test | Local red rust on parts of the surface coated only with topcoat (<40%) | No red rust on the surface coated only with topcoat, but increased RR run traces from the uncoated edges and bores/holes |
| 96 h | Severe red rust, increasing further over the course of the salt spray test | Local red rust on parts of the surface coated only with topcoat (<40%) | Red rust on the surface coated only with topcoat, even at coated edges; increased RR run |

TABLE 14-continued

Results for the coated brake discs in the neutral salt spray test; topcoat layer thickness: 8 μm

| Duration | Topcoat A | Topcoat K | Topcoat L |
|---|---|---|---|
| 165 h | Severe red rust, increasing further over the course of the salt spray test | Red rust on parts of the surface coated only with topcoat (<50%) | traces from the uncoated edges and bores/holes Increasing red rust on the surface coated only with topcoat, even at coated edges; increased RR run traces from the uncoated edges and bores/holes; otherwise the surface is largely still silvery bright (at least 80%) |

It is apparent that the systems coated with organic polymers containing ionic groups, applied in double thickness, exhibit significantly improved corrosion control properties.

| List of reference numerals: | |
|---|---|
| 1 | coating system |
| 2 | substrate |
| 3 | first layer |
| 4 | second layer |

The invention claimed is:

1. Coating system, more particularly corrosion control coating system, for generating cathodic corrosion protection on a metallic substrate, comprising at least two compositions,
characterized in that the coating system comprises:
(a) a first composition for forming a first layer in the form of an anhydrous cathodic corrosion control composition configured to crosslink on exposure to moisture at temperatures of less than 100° C.,
wherein the first cathodic corrosion control composition comprises at least one non-aqueous solvent, and
(b) a second composition for forming a second layer in the form of an aqueous-based coating composition;
wherein the second composition comprises hydrophilic, inorganic, or organic, polymer compounds;
wherein the second composition comprises ionic constituents in amounts of 0.1 to 5 wt %, based on the second composition, and/or
wherein the hydrophilic, inorganic or organic polymeric compound comprises ionic fractions; and
wherein the coating system is configured for curing at temperatures of 20° C. to 100° C.

2. Coating system according to claim 1, characterized in that the first composition forming the first layer comprises an organically modified inorganically based matrix.

3. Coating system according to claim 2, characterized in that the inorganically based matrix comprises inorganic oxides selected from the group consisting of oxides of silicon, oxides of titanium, oxides of zirconium, and combinations thereof.

4. Coating system according to claim 1, characterized in that the first composition is crosslinked by exposure to atmospheric moisture.

5. Coating system according to claim 1, characterized in that the first composition crosslinks at temperatures in the range from 30 to 90° C.

6. Coating system according to claim 5, characterized in that the first composition crosslinks at temperatures in the range from 50 to 80° C.

7. Coating system according to claim 1, characterized in that the first composition comprises metal particles.

8. Coating system according to claim 7, characterized in that the first composition comprises at least 50 wt % of metal particles, based on the first composition.

9. Coating system according to claim 7, characterized in that the first composition comprises a fraction of metal particles in the range from 50 to 95 wt %, based on the first composition.

10. Coating system according to claim 7, characterized in that the first composition comprises shaped metal particles selected from the group consisting of platelet-shaped metal particles, granular shaped metal particles, spherical shaped metal particles, and combinations thereof.

11. Coating system according to claim 7, characterized in that the metal particles are formed on the basis of metal particles selected from the group consisting of aluminum particles, zinc particles, alloys thereof, and combinations thereof.

12. Coating system according to claim 2, characterized in that the second layer is formed in the form of a transparent layer.

13. Coating system according to claim 1, wherein the coating system is configured for application to a metallic substrate comprising at least one metal selected from the group consisting of aluminum, alloys of aluminum, iron, and alloys of iron.

14. Method for producing a coating system, more particularly a corrosion control coating system, according to claim 1, for generating cathodic corrosion protection on a metallic substrate, the method comprising:
(A) applying a first substantially anhydrous coating composition to a metallic substrate to form a first layer, wherein the coating composition crosslinks upon exposure to moisture at temperatures of less than 100° C. to generate a cathodic corrosion control coating, and
(B) applying a second coating composition to the first layer before the first layer is cured, wherein the second coating composition is an aqueously based coating comprising hydrophilic, inorganic or organic, polymeric compounds,
wherein the second composition comprises ionic constituents in amounts of 0.1 to 5 wt %, based on the second composition, and/or
wherein the hydrophilic, inorganic or organic polymeric compound comprises ionic fractions; and
wherein after applying the second coating composition the first coating is crosslinked on exposure to moisture.

15. Method according to claim 14, characterized in that the first coating is crosslinked on exposure to atmospheric moisture and heating up to about 100° C.

16. Kit for producing a coating system according to claim 1, comprising a first cathodic coating composition, and a second coating composition, wherein the second coating composition includes a topcoat composition.

* * * * *